US012145372B2

(12) United States Patent
Watanabe

(10) Patent No.: US 12,145,372 B2
(45) Date of Patent: *Nov. 19, 2024

(54) LIQUID STORAGE CONTAINER AND METHOD FOR MANUFACTURING THE SAME

(71) Applicant: CANON KABUSHIKI KAISHA, Tokyo (JP)

(72) Inventor: Masahisa Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,937

(22) Filed: Nov. 3, 2023

(65) Prior Publication Data

US 2024/0059071 A1 Feb. 22, 2024

Related U.S. Application Data

(62) Division of application No. 17/945,666, filed on Sep. 15, 2022, now Pat. No. 11,833,830, which is a (Continued)

(30) Foreign Application Priority Data

Dec. 20, 2019 (JP) ................................ 2019-230164

(51) Int. Cl.
*B41J 2/175* (2006.01)

(52) U.S. Cl.
CPC ....... *B41J 2/17513* (2013.01); *B41J 2/17503* (2013.01); *B41J 2/17566* (2013.01)

(58) Field of Classification Search
CPC .... B41J 2/175; B41J 2/17503; B41J 2/17506; B41J 2/17513; B41J 2/17553;
(Continued)

(56) References Cited

U.S. PATENT DOCUMENTS

| | | | | |
|---|---|---|---|---|
| 7,192,128 | B1 * | 3/2007 | Hattori | B41J 2/17513 347/7 |
| 7,246,894 | B2 | 7/2007 | Hattori et al. | B41J 2/175 |

(Continued)

FOREIGN PATENT DOCUMENTS

| | | |
|---|---|---|
| CN | 201960833 U | 9/2011 |
| JP | 2009-208268 | 9/2009 |

(Continued)

OTHER PUBLICATIONS

Office Action dated Aug. 27, 2024 in counterpart Japanese Application No. 2023-147717, together with English translation thereof.

*Primary Examiner* — Anh T Vo
(74) *Attorney, Agent, or Firm* — Venable LLP

(57) ABSTRACT

A liquid storage container includes a container main body that is capable of storing a liquid and at least a portion of which includes a translucent outer wall; a support member that is integrally formed with the container main body; and a rotation member that is rotatably supported by the support member. The rotation member includes a float that rotates due to fluctuations in a liquid level of the liquid, and a display member that rotates in conjunction with the float and is capable of displaying a position of the float to an outside through the translucent outer wall.

7 Claims, 4 Drawing Sheets

Related U.S. Application Data division of application No. 17/115,083, filed on Dec. 8, 2020, now Pat. No. 11,472,188.

(58) Field of Classification Search
CPC .......... B41J 2/17566; B41J 2002/17573; B41J 2002/17576
See application file for complete search history.

(56) References Cited

U.S. PATENT DOCUMENTS

| | | | |
|---|---|---|---|
| 8,042,925 B2 | 10/2011 | Sugahara et al. | 347/86 |
| 8,057,027 B2 | 11/2011 | Kanbe | 347/86 |
| 10,675,882 B2 * | 6/2020 | Shiba | B41J 2/17566 |
| 11,472,188 B2 * | 10/2022 | Watanabe | B41J 2/17553 |
| 11,833,830 B2 * | 12/2023 | Watanabe | B41J 2/17566 |
| 2006/0033789 A1 | 2/2006 | Sasaki et al. | B41J 2/175 |
| 2009/0219323 A1 | 9/2009 | Silverbrook et al. | |
| 2009/0219355 A1 | 9/2009 | Kanbe | 347/86 |
| 2016/0368272 A1 | 12/2016 | Ono et al. | |

FOREIGN PATENT DOCUMENTS

| | | |
|---|---|---|
| JP | 2012-000861 A | 1/2012 |
| JP | 2017-007147 A | 1/2017 |
| JP | 2017-114017 A | 6/2017 |

* cited by examiner

LIQUID STORAGE CONTAINER AND METHOD FOR MANUFACTURING THE SAME

This application is a divisional of application Ser. No. 17/945,666 filed Sep. 15, 2022, issued as U.S. Pat. No. 11,833,830 on Dec. 5, 2023, which is a divisional of application Ser. No. 17/115,083 filed Dec. 8, 2020, issued as U.S. Pat. No. 11,472,188 on Oct. 18, 2022; and claims priority under 35 U.S.C. § 119 to Japan Application JP 2019-230164 filed in Japan on Dec. 20, 2019; and the contents of all of which are incorporated herein by reference as if set forth in full.

BACKGROUND OF THE INVENTION

Field of the Invention

The present invention relates to a liquid storage container and a method for manufacturing the same.

Description of the Related Art

A liquid ejection apparatus that ejects a liquid (ink) from a liquid ejection head to a recording medium and records an image on the recording medium is provided with an ink tank for storing an ink to be supplied to the liquid ejection head. Japanese Patent Application Laid-Open No. 2009-208268 discloses an ink tank capable of detecting a remaining amount of ink. Inside the ink tank, a bearing rib, a support block, a support shaft supported by the bearing rib and the support block and an arm rotatably supported by the support shaft are provided. An arm has a float portion and an indicator portion. When the float portion rotates due to buoyancy, the indicator portion rotates in conjunction with the float portion. By optically detecting the movement of the indicator portion, the remaining amount of ink in the ink tank is detected.

A liquid storage container disclosed in Japanese Patent Application Laid-Open No. 2009-208268 requires many components because the mechanism for detecting the remaining amount of liquid is complicated. Therefore, it is an object of the present invention to provide a liquid storage container with a reduced number of components.

SUMMARY OF THE INVENTION

According to an aspect of the present invention, there is provided a liquid storage container including: a container main body that is capable of storing a liquid and at least a portion of which includes a translucent outer wall; a support member that is integrally formed with the container main body; and a rotation member that is rotatably supported by the support member. The rotation member includes a float that rotates due to fluctuations in a liquid level of the liquid, and a display member that rotates in conjunction with the float and is capable of displaying a position of the float to an outside through the translucent outer wall.

Further features of the present invention will become apparent from the following description of exemplary embodiments with reference to the attached drawings.

DESCRIPTION OF THE EMBODIMENTS

Several embodiments of the present invention will be described with reference to the drawings. In each drawing, the same member is assigned the same reference number, and duplicate description may be omitted. Although the embodiments described below are intended for an ink tank mounted on an ink jet printer, the present invention can be widely applied to a liquid storage container mounted on a liquid ejection apparatus. In the present embodiment, "integrally formed" does not mean that a plurality of components or members is integrated by an adhesive or a fastening unit, and is used to mean manufacturing from the beginning as a single component or member by a unit such as injection molding.

First Embodiment

Figure 1:
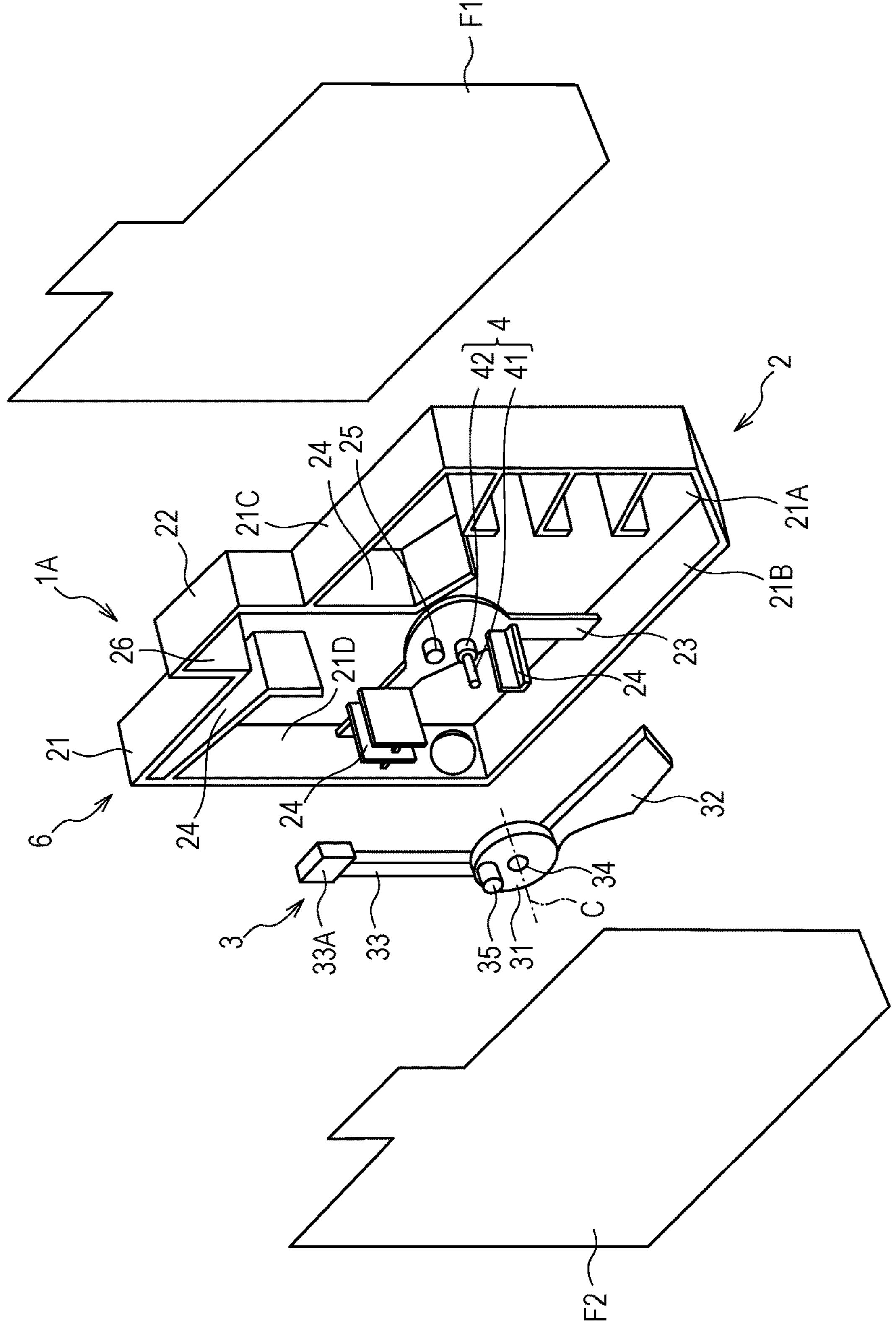
FIG. 1 is an exploded perspective view of a liquid storage container according to a first embodiment of the present invention.
Figure 2A:
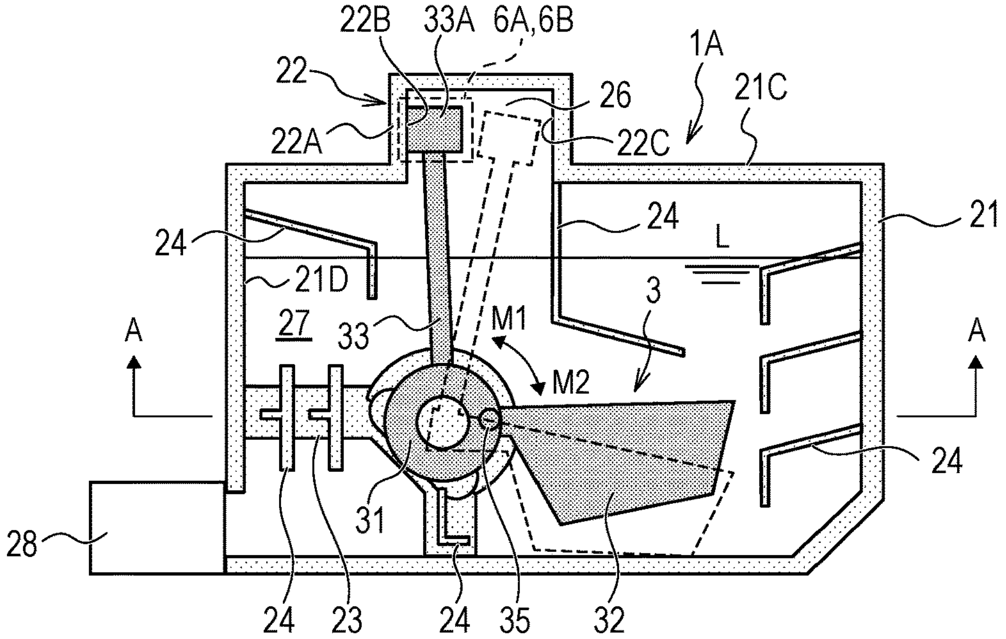
FIG. 2A is a cross-sectional view of the liquid storage container according to the first embodiment of the present invention.
Figure 2B:
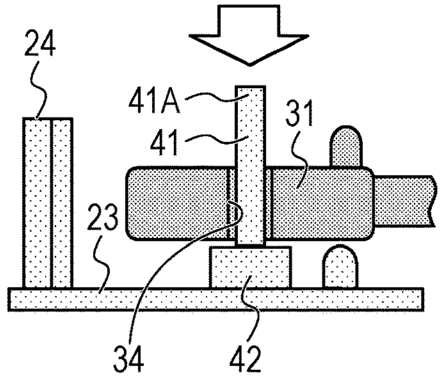
FIG. 2B is a cross-sectional view of the liquid storage container according to the first embodiment of the present invention.
Figure 2C:
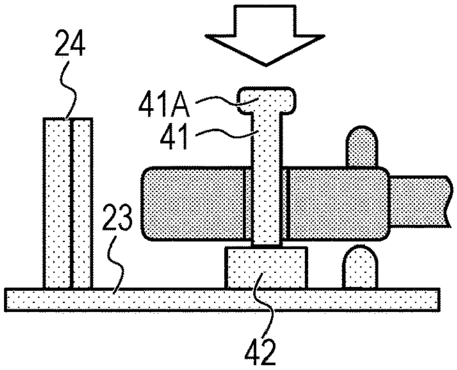
FIG. 2C is a cross-sectional view of the liquid storage container according to the first embodiment of the present invention.
Figure 2D:
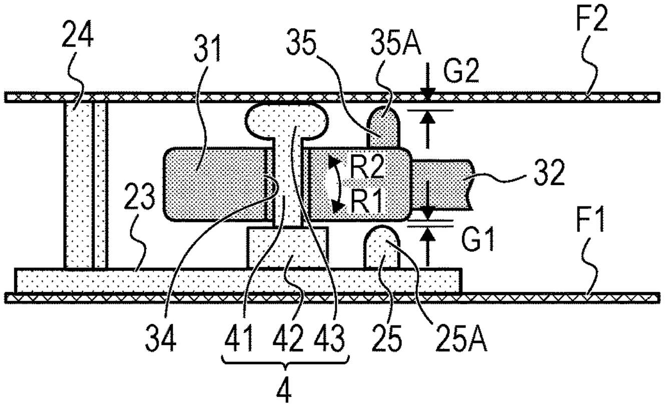
FIG. 2D is a cross-sectional view of the liquid storage container according to the first embodiment of the present invention.

FIG. 1 is an exploded perspective view of a liquid storage container 1A according to the first embodiment. FIG. 2A is a schematic cross-sectional view of the liquid storage container 1A according to the first embodiment, an upper part of the figure illustrates upward in the vertical direction when using the liquid ejection apparatus, and a lower part of the figure illustrates downward in the vertical direction when using the liquid ejection apparatus. FIG. 2A is a side cross-sectional view, and FIGS. 2B to 2D are schematic cross-sectional views illustrating a method for manufacturing the liquid storage container 1A. FIG. 2D illustrates a completed liquid storage container 1A, that is, a cross-sectional view taken along the line A-A of FIG. 2A. The liquid storage container 1A includes a container main body 2 capable of storing an ink, a rotation member 3 housed inside the container main body 2 to detect the amount of ink and a support member 4 rotatably supporting the rotation member 3.

The container main body 2 includes a frame member 21, a first film F1 and a second film F2. The frame member 21 is made of a transparent or semi-transparent translucent material. The frame member 21 is integrally formed by injection molding a synthetic resin such as polyacetal, nylon, polyethylene and polypropylene. The frame member 21 has openings on both side surfaces orthogonal to a rotation axis of the rotation member 3. Specifically, an opening of the frame member 21 close to a first displacement regulation portion 42 (described later) is a first opening 21A, and an opening of the frame member 21 close to a second displacement regulation portion 43 (described later) is a second opening 21B. A translucent protrusion portion 22 protruding upward is formed in a central portion of an upper side 21C of the frame member 21. An inside of the protrusion portion 22 is an internal space 26, and a tip end portion 33A of a display member 33 (described later) is movably housed in the internal space 26. At least a portion of an outer wall of the container main body 2 may have translucency. As long as the protrusion portion 22 is made of a translucent material, other parts of the frame member 21 may be made of a non-translucent material.

The container main body 2 includes a base member 23 protruding from an inner wall surface 21D of the frame member 21. The base member 23 is integrally formed with the frame member 21. The base member 23 is a substantially L-shaped member fixed to one side wall and the bottom surface of the frame member 21. The base member 23 is provided mainly for attaching the rotation member 3 via the support member 4. The base member 23 also has a function of holding the first film F1 and a function of reinforcing the frame member 21 and increasing the rigidity of the frame member 21. The shape and position of the base member 23 are not limited, and it is desirable that the base member 23 is fixed to the frame member 21 at a plurality of positions of the inner wall surface 21D (two sides of the frame member 21 adjacent to each other in the present embodiment). As a result, the rigidity of the frame member 21 is increased. The container main body 2 has a plurality of ribs 24. The rib 24 has a non-linear cross section to ensure rigidity. A portion of ribs 24 are fixed to the inner wall surface 21D of the frame member 21 and are integrally formed with the frame member 21. A portion of ribs 24 are fixed to the base member 23 and are integrally formed with the base member 23. That is, the frame member 21, the base member 23 and the rib 24 are integrally formed by injection molding. The rib 24 reinforces the frame member 21, increases the rigidity of the frame member 21, and also has a function of holding the first and second films F1 and F2. A portion or all of the rib 24 may be omitted. As a result, in addition to reducing the cost of the liquid storage container 1A, the amount of ink stored is increased. A first protrusion 25 is formed on the surface of the base member 23 facing the rotation member 3. A gap G1 is provided between the tip end portion 25A of the first protrusion 25 and a central connection portion 31 (described later) of the rotation member 3.

The first film F1 and the second film F2 are made of a transparent resin. The first film F1 is welded to a peripheral edge portion of the first opening 21A of the frame member 21 by a heat welding method to cover the first opening 21A of the frame member 21. The second film F2 is welded to a peripheral edge portion of the second opening 21B of the frame member 21 by a heat welding method to cover the second opening 21B of the frame member 21. A space surrounded by the frame member 21 and the first and second films F1 and F2 forms an ink storage chamber 27 in which the ink is stored. The first film F1 is also bonded to the base member 23 and the ribs 24 (excluding the ribs 24 bonded to the base member 23), and the second film F2 is also bonded to all the ribs 24. As a result, the first and second films F1 and F2 are held at many parts, a bonding area is increased and the reliability of the container main body 2 is enhanced. Instead of providing the first and second films F1 and F2, the container main body 2 may be formed as a rectangular parallelepiped container, and the ink storage chamber 27 may be formed therein. An ink supply port 28 for supplying the ink to a liquid ejection head is provided in the lower portion of the ink storage chamber 27.

The rotation member 3 is a member for detecting the amount of ink stored in the ink storage chamber 27. A rotation member 3 includes a central connection portion 31 having a rotation center C, a float 32 connected to the central connection portion 31 and a display member 33 connected to the central connection portion 31. The display member 33 extends substantially upward in the vertical direction from the rotation center C of the rotation member 3, and the float 32 extends downward from the display member 33, substantially horizontally in the present embodiment, from the rotation center C. Therefore, a rotational moment received by the rotation member 3 is mainly determined by the weight of the float 32 and the buoyancy received by the float 32. Since the display member 33 hardly contributes to the rotational moment of the rotation member 3, the degree of freedom in the material and shape of the display member 33 is high.

The central connection portion 31 is a substantially circular plate-shaped member, and a hole is provided in the central portion, that is, at a position serving as the rotation center C of the rotation member 3. The hole is a through-hole 34 penetrating the central connection portion 31, and functions as a bearing for the rotation member 3. A second protrusion 35 is formed on a surface of the peripheral edge portion of the central connection portion 31 facing the second film F2. A gap G2 is provided between the tip end portion 35A of the second protrusion 35 and the second film F2. The float 32 is an arm-shaped member that is supported by the central connection portion 31 and extends in the radial direction from the central connection portion 31. The float 32 is made of a hollow resin, and the average specific gravity including the internal space is smaller than the specific gravity of the ink. Therefore, the float 32 rotates due to fluctuations in the liquid level of the ink. Instead of the hollow-structured float 32, a solid-structured float 32 made of a material having a specific gravity smaller than that of the ink may be used. In this case, the float 32 can be integrally formed with the central connection portion 31 and the display member 33. The display member 33 is an arm-shaped member extending in the radial direction from the central connection portion 31, and is a member capable of displaying the position of the float 32 to the outside. The display member 33 is movably housed in the internal space 26 of the protrusion portion 22, and the internal space 26 of the protrusion portion 22 can be rotated in conjunction with the float 32 via the central connection portion 31. As a result, the display member 33 can indirectly display the position of the float 32 to the outside through a translucent outer wall 22A of the protrusion portion 22, and can display a remaining amount of ink in the ink storage chamber 27. The tip end portion 33A of the display member 33 is formed wider than other parts of the display member 33.

The support member 4 includes a pin 41 inserted into the through-hole 34, and first and second displacement regulation portions 42 and 43 provided on both sides of the pin 41 in the axial direction. The support member 4 is made of synthetic resin. The pin 41 rotatably supports the rotation member 3. The first and second displacement regulation portions 42 and 43 have outer diameters larger than the inner diameter of the through-hole 34, and have a shape that cannot be inserted into the through-hole 34. As a result, the first and second displacement regulation portions 42 and 43 regulate the displacement of the rotation member 3 in the rotation axis direction. The first displacement regulation portion 42 and the pin 41 are integrally formed with the frame member 21 and the base member 23 by injection molding. The second displacement regulation portion 43 is formed by plastically deforming a tip end portion 41A of the pin 41, as will be described later.

Next, an operation of the rotation member 3 will be described with reference to FIG. 2A. A liquid level L of the ink is located above the ink storage chamber 27. Due to the buoyancy received by the float 32, the rotation member 3 receives a counterclockwise rotational moment M1. Since the tip end portion 33A of the display member 33 is in the internal space 26 of the protrusion portion 22 of the frame member 21, the tip end portion 33A of the display member 33 abuts on an inner wall surface 22B on the left side of the protrusion portion 22 to prevent the rotation member 3 from rotating further counterclockwise. That is, the tip end portion 33A of the display member 33 is located at the left end of the internal space 26 of the protrusion portion 22. Alight emitting portion 6A and a light receiving portion 6B of the sensor are provided on both sides in the direction orthogonal to the paper surface sandwiching the protrusion portion 22, that is, on the front and rear sides of the paper surface in the region surrounded by the dotted line in FIG. 2A. When the tip end portion 33A of the display member 33 is in the position illustrated in the drawing, the light emitted from the light emitting portion 6A is not received by the light receiving portion 6B. As a result, it is detected that the tip end portion 33A of the display member 33 is in the region surrounded by the dotted line, and it is determined that the remaining amount of ink is a predetermined amount or more.

When the ink is consumed and the liquid level L of the ink is lowered to a predetermined position, the upper portion of the float 32 is exposed from the ink, and the exposed portion of the float 32 is not subjected to buoyancy. The counterclockwise rotational moment M1 due to the buoyancy received by the float 32 and a clockwise rotational moment M2 due to the weight of the float 32 coincide with each other, and the force that presses the tip end portion 33A of the display member 33 against the inner wall surface 22B on the left side of the protrusion portion 22 is lost. When the liquid level L of the ink is further lowered, the clockwise rotational moment M2 due to the weight of the float 32 exceeds the counterclockwise rotational moment M1 due to the buoyancy received by the float 32, and the rotation member 3 rotates clockwise. As a result, the buoyancy received by the float 32 is restored, and the counterclockwise rotational moment M1 and the clockwise rotational moment M2 coincide with each other. At this time, the tip end portion 33A of the display member 33 is located between the inner wall surface 22B on the left side and an inner wall surface 22C on the right side of the protrusion portion 22, that is, at a position separated from both inner wall surfaces 22B and 22C. When the ink is further consumed, the rotation member 3 rotates clockwise again, and finally the lower end of the float 32 abuts on the bottom surface of the ink storage chamber 27 as illustrated by the broken line. The rotation member 3 is prevented from rotating further clockwise, and the tip end portion 33A of the display member 33 stops at a predetermined position between the inner wall surface 22B on the left side and the inner wall surface 22C on the right side of the protrusion portion 22. The light emitted from the light emitting portion 6A is received by the light receiving portion 6B, and the sensor detects that the tip end portion 33A of the display member 33 is on the right side of the internal space 26 of the protrusion portion 22. As a result, the remaining amount of ink is substantially zero, and it is determined that the liquid storage container 1A has reached the replacement time. In order to improve the detection accuracy of the position of the tip end portion 33A of the display member 33, when the lower end of the float 32 abuts on the bottom surface of the ink storage chamber 27, it is desirable that the tip end portion 33A of the display member 33 reaches the vicinity of the inner wall surface 22C on the right side of the protrusion portion 22. In the above description, only the buoyancy received by the float 32 and the weight of the float 32 are focused on, and in reality, the buoyancy received by the display member 33 and the rotational moment due to the weight of the display member 33 are also taken into consideration. However, as described above, these are not the dominant factors.

The inner diameter of the through-hole 34 of the rotation member 3 is larger than the outer diameter of the pin 41 so that the rotation member 3 smoothly rotates around the pin 41. Therefore, the rotation axis of the rotation member 3 may be inclined with respect to a central axis of the pin 41. In FIG. 2D, when the rotation member 3 rotates clockwise R1 and falls to the side of the first film F1, the through-hole 34 of the rotation member 3 may obliquely come into contact with the pin 41, and the smooth rotation of the rotation member 3 may be impaired. However, in a case where the rotation member 3 falls to the side of the first film F1, the central connection portion 31 abuts on the first protrusion 25, and the rotation member 3 is prevented from rotating further clockwise. Similarly, in FIG. 2D, in a case where the rotation member 3 rotates counterclockwise R2 and falls to the side of the second film F2, the second film F2 abuts on the second protrusion 35 to prevent the rotation member 3 from rotating further counterclockwise. On the other hand, gaps G1 and G2 are provided between the tip end portion 25A of the first protrusion 25 and the central connection portion 31, and between the tip end portion 35A of the second protrusion 35 and the second film F2. Therefore, normally, the rotation member 3 does not come into contact with one of the first protrusion 25 and the second film F2. With the above configuration, the rotation member 3 can smoothly rotate around the pin 41. Although not illustrated, the first protrusion 25 may be formed on the surface of the central connection portion 31 facing the base member 23.

Next, a method for manufacturing the liquid storage container 1A will be described with reference to FIGS. 2B to 2D. First, the frame member 21, the base member 23, the rib 24, the first displacement regulation portion 42 and the pin 41 are integrally formed by injection molding. Separately from this, the rotation member 3 is prepared. As illustrated in FIG. 2B, the pin 41 is inserted into the through-hole 34 of the central connection portion 31 of the rotation member 3. The tip end portion 41A of the pin 41 is exposed to the outside of the through-hole 34. Next, as illustrated in FIG. 2C, the exposed tip end portion 41A is plastically deformed by heat or pressure using a jig (not illustrated). The exposed tip end portion 41A is compressed in the axial direction and expanded in the radial direction. Next, as illustrated in FIG. 2D, the tip end portion 41A of the pin 41 is pushed to a predetermined position, and further expanded in the radial direction to form a second displacement regulation portion 43. As a result, the displacement regulation portions 42 and 43 that regulate the displacement of the rotation member 3 in the rotation axis direction are formed on both sides of the pin 41 in the axial direction. Thereafter, the first film F1 and the second film F2 are bonded to both side edge portions of the frame member 21, and the ink storage chamber 27 is filled with the ink.

According to the present embodiment, the frame member 21, the base member 23, the rib 24, the first displacement regulation portion 42 and the pin 41 are integrally formed, and the second displacement regulation portion 43 is formed by deforming the tip end portion 41A of the pin 41. That is, the frame member 21, the base member 23, the rib 24, the first and second displacement regulation portions 42 and 43 and the pin 41 are integrally formed (these are referred to as a frame assembly 7). The liquid storage container 1A can be prepared with only four members such as the frame assembly 7, the rotation member 3 and the first and second films F1 and F2. Therefore, according to the present embodiment, it is possible to provide the liquid storage container 1A in which the number of components is reduced. Moreover, since the frame assembly 7 can be prepared by injection molding of synthetic resin, it can be prepared inexpensively and in a short time.

Second Embodiment

Hereinafter, a liquid storage container 1B of a second embodiment will be described with reference to FIGS. 3A to 3D. FIGS. 3A to 3D are the same views as FIGS. 2A to 2D illustrating the first embodiment. Although the illustration of a portion of the ribs 24 are omitted in FIGS. 3A to 3D, the ribs 24 integrated with the frame member 21 can be prepared as in the first embodiment, and thus the same effect can be achieved. The second embodiment is the same as the first embodiment except that a method for supporting the rotation member 3 is different. For the configuration and effect for which the description is omitted, refer to the description of the first embodiment. The first displacement regulation portion 42 has a shape that cannot be inserted into the through-hole 34, and is integrally formed with the pin 41. The second displacement regulation portion is provided as a fixing block 5 provided with a hole 54 for receiving the end portion of the pin 41. The fixing block 5 includes a disc-shaped first portion 51, a disc-shaped second portion 52 concentric with the first portion 51 and having a hole 54 in the center and a plurality of leg portions 53 formed on the edge portions of the first portion 51. The fixing block 5 is fixed to the base member 23 by bonding the leg portion 53 to the base member 23. The leg portions 53 are installed so as to avoid the moving range of the float 32. Similar to the first embodiment, the first film F1 is bonded to the peripheral edge portion of the frame member 21, the base member 23 and the rib 24. The second film F2 is bonded to the peripheral edge portion of the frame member 21 and the fixing block 5. The second protrusion 35 is formed on the surface of the first portion 51 of the fixing block 5 facing the rotation member 3. Although not illustrated, the second protrusion 35 may be formed on the surface of the rotation member 3 facing the first portion 51 of the fixing block 5. In the present embodiment, the number of components is increased as compared with the first embodiment, and since one end of the pin 41 is supported by the fixing block 5, the operation of the rotation member 3 is smoother. The hole 54 may be omitted so that the pin 41 abuts on the surface of the fixing block 5. Even in this case, the pin 41 is constrained to be displaced in the axial direction by the fixing block 5.

Figure 3A:
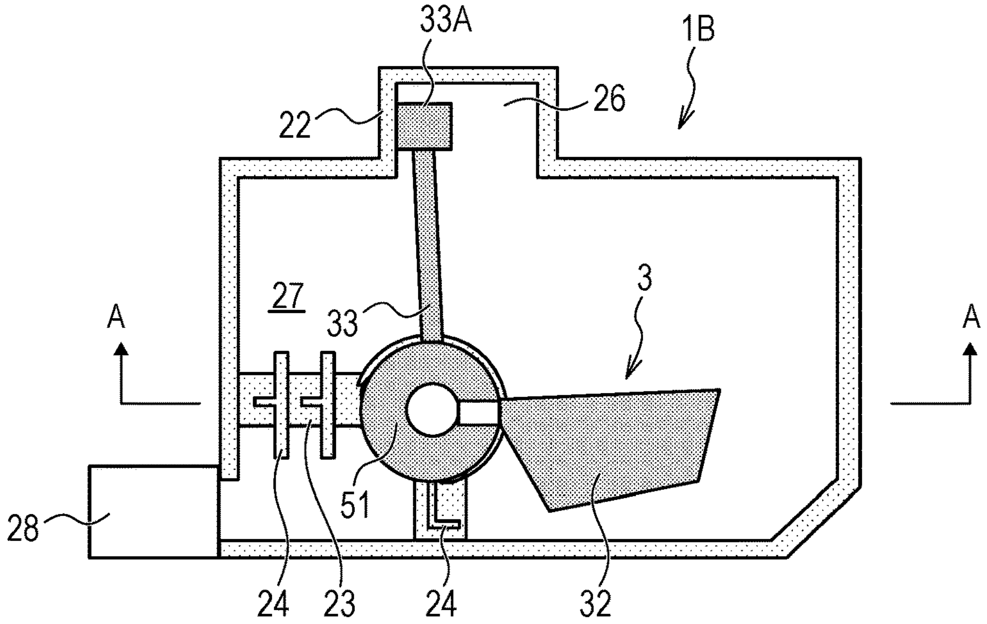
FIG. 3A is a cross-sectional view of a liquid storage container according to a second embodiment of the present invention.
Figure 3B:
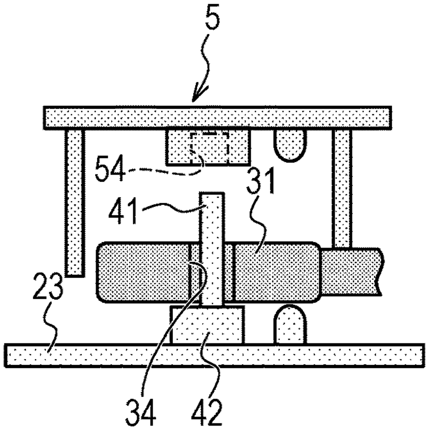
FIG. 3B is a cross-sectional view of the liquid storage container according to the second embodiment of the present invention.
Figure 3C:
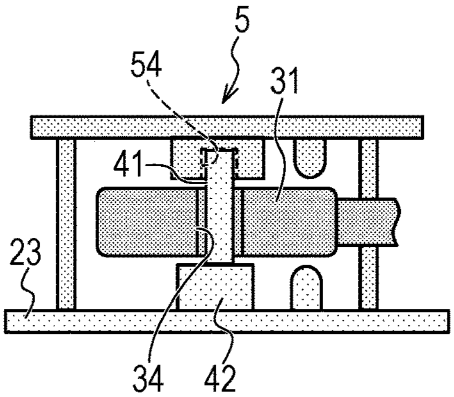
FIG. 3C is a cross-sectional view of the liquid storage container according to the second embodiment of the present invention.
Figure 3D:
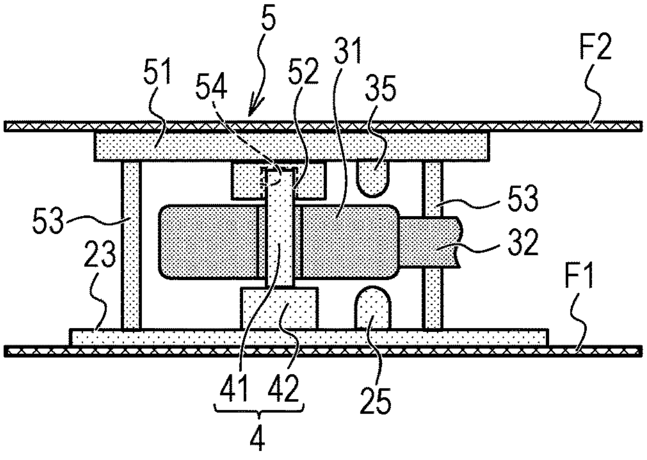
FIG. 3D is a cross-sectional view of the liquid storage container according to the second embodiment of the present invention.

The liquid storage container 1B of the present embodiment can be manufactured as follows. First, the frame member 21, the first displacement regulation portion 42 and the pin 41 are integrally formed by injection molding. Separately from this, a rotation member 3 having the same configuration as that of the first embodiment is prepared. Next, as illustrated in FIG. 3B, the pin 41 is inserted into the through-hole 34 of the central connection portion 31 of the rotation member 3. The tip end portion 41A of the pin 41 is exposed to the outside of the through-hole 34. Next, as illustrated in FIG. 3C, the fixing block 5 is lowered, and the tip end portion 41A of the pin 41 is inserted into the hole 54 of the fixing block 5. In addition, the fixing block 5 is bonded to the base member 23. Next, as illustrated in FIG. 3D, the first film F1 and the second film F2 are bonded to both side edge portions of the frame member 21, and the ink storage chamber 27 is filled with the ink.

Third Embodiment

Hereinafter, a liquid storage container 1C of a third embodiment will be described with reference to FIGS. 4A to 4D. FIGS. 4A to 4D are the same views as FIGS. 2A to 2D illustrating the first embodiment. Although the description of a portion of the ribs 24 are omitted in FIGS. 4A to 4D, the ribs 24 integrated with the frame member 21 can be prepared as in the first embodiment, and thus the same effect can be achieved. The third embodiment is the same as the first embodiment except that a configuration of the rotation member 3 is different. For the configuration and effect for which the description is omitted, refer to the description of the first embodiment. The first displacement regulation portion 42 is formed integrally with the pin 41. The second displacement regulation portion 37 is provided as a portion of the rotation member 3, specifically, the second displacement regulation portion 37 integrated with the central connection portion 31. The central connection portion 31 is a disc-shaped member similar to that of the first embodiment. The rotation member 3 is provided with a hole 36 that terminates in the middle and receives the pin 41. The first displacement regulation portion 42 has a shape that cannot be inserted into the hole 36. The first film F1 is bonded to the peripheral edge portion of the frame member 21, the base member 23 and the rib 24 as in the first embodiment, and the second film F2 is bonded to the peripheral edge portion of the frame member 21 as in the first embodiment. The second displacement regulation portion 37 has a tapered shape in which the cross-sectional area decreases toward the tip end portion 37A facing the second film F2, and the tip end portion 37A abuts on the second film F2. An example of the tapered shape is a conical shape, and a truncated cone, a pyramid and a pyramid cone may be used. The displacement of the pin 41 of the rotation member 3 in the axial direction is regulated by the first displacement regulation portion 42 and the second displacement regulation portion 37 of the rotation member 3. The displacement of the pin 41 of the second displacement regulation portion 37 in the axial direction is regulated by the second film F2. Therefore, the rotation member 3 can rotate without being detached from the pin 41. Since the rotation member 3 abuts on the second film F2 at the tapered tip end portion 37A, the rotation of the rotation member 3 is not significantly hindered. The first protrusion 25 is provided in the same manner as in the first and second embodiments, and the second protrusion 35 is unnecessary because the second protrusion 35 is replaced by the second displacement regulation portion 37. Since the number of components of the present embodiment is the same as that of the first embodiment and the step of deforming the pin 41 is unnecessary as described later, the step can be shortened.

Figure 4A:
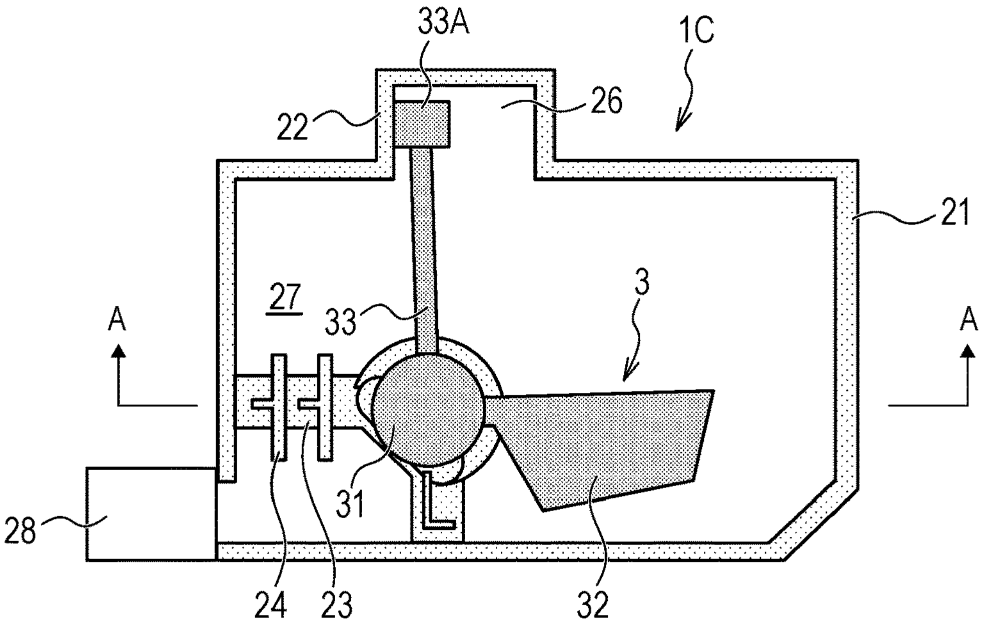
FIG. 4A is a cross-sectional view of a liquid storage container according to a third embodiment of the present invention.
Figure 4B:
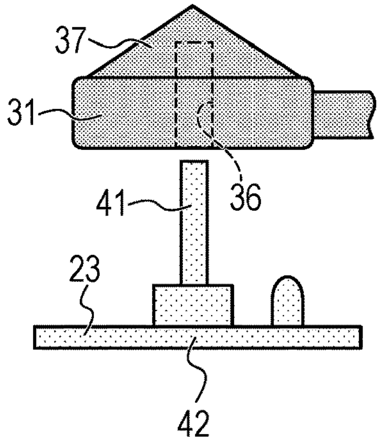
FIG. 4B is a cross-sectional view of the liquid storage container according to the third embodiment of the present invention.
Figure 4C:
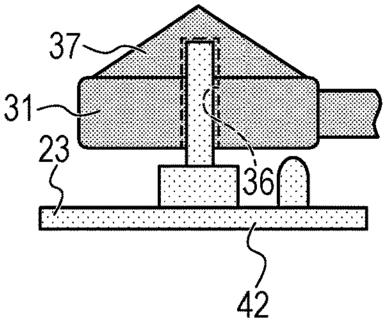
FIG. 4C is a cross-sectional view of the liquid storage container according to the third embodiment of the present invention.
Figure 4D:
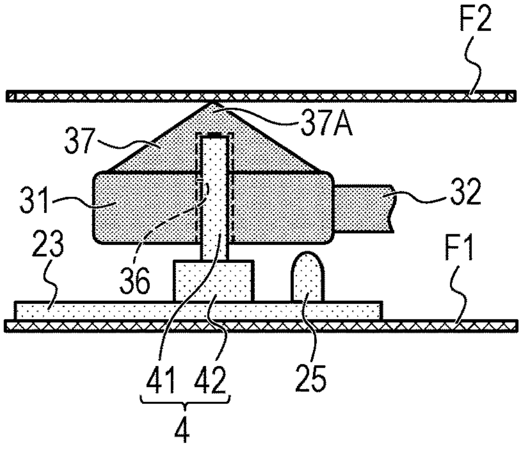
FIG. 4D is a cross-sectional view of the liquid storage container according to the third embodiment of the present invention.

The liquid storage container 1C of the present embodiment can be manufactured as follows. First, the frame member 21, the first displacement regulation portion 42 and the pin 41 are integrally formed by injection molding. Separately from this, the rotation member 3 is prepared. Next, as illustrated in FIG. 4B, the pin 41 is inserted into the hole 36 of the central connection portion 31 of the rotation member 3. Next, as illustrated in FIG. 4C, the pin 41 is inserted into the rear of the hole 36 of the rotation member 3. Next, as illustrated in FIG. 4D, the first film F1 and the second film F2 are bonded to both side edge portions of the frame member 21, and the ink storage chamber 27 is filled with the ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-230164, filed Dec. 20, 2019, which is hereby incorporated by reference herein in its entirety.

What is claimed is:

1. A liquid storage container comprising:

a container main body capable of storing a liquid inside the container main body, wherein the container main body includes:

a frame portion, and a base portion protruding from an inner wall surface of the frame portion;

a rotation member rotating around a rotational axis due to fluctuation in a liquid level of the liquid, wherein the rotation member includes:

a float portion, a display portion configured to be visible from an outside, and a connection portion connected to the float portion and the display portion having a hole which matches the rotational axis; and a supporting member formed integrally with the base portion and rotatably supporting the rotation member, wherein the supporting member includes:

a pin inserted into the hole and rotatably supporting the rotation member, and a displacement regulation portion regulating displacement of the rotation member in the rotational axis direction.

2. The liquid storage container according to claim 1, wherein the base portion is fixed to the frame portion at a plurality of positions on the inner wall surface.

3. The liquid storage container according to claim 1, wherein the hole is a through-hole that penetrates the rotation member, and the displacement regulation portion has a shape not capable of being inserted into the through-hole and is integrally formed with the pin.

4. The liquid storage container according to claim 1, wherein the frame portion includes a first opening and a second opening facing the first opening, further includes a first film provided to cover the first opening and a second film provided to cover the second opening, the first film is bonded to the base portion, and the second film is bonded to a peripheral edge portion of the frame portion.

5. The liquid storage container according to claim 4, wherein a first protrusion is formed on a surface of the base portion facing the rotation member or a surface of the rotation member facing the base portion, and a second protrusion is formed on a surface of the rotation member facing the second film.

6. Liquid storage container according to claim 4, further comprising:

a rib that is formed integrally with the frame portion or the base member, wherein the second film is further bonded to the rib.

7. The liquid storage container according to claim 1, wherein the display portion extends substantially upward in a vertical direction from a rotation center of the rotation member, and the float portion extends downward of the display portion from the rotation center.

* * * * *